(12) United States Patent
Johannsen

(10) Patent No.: US 11,820,446 B2
(45) Date of Patent: Nov. 21, 2023

(54) GROUND-ENGAGING TRACK SHOE HAVING RAISED-RELIEF FIXTURING SURFACES

(71) Applicant: Caterpillar Inc., Peoria, IL (US)

(72) Inventor: Eric James Johannsen, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 330 days.

(21) Appl. No.: 17/196,533

(22) Filed: Mar. 9, 2021

(65) Prior Publication Data

US 2022/0289322 A1 Sep. 15, 2022

(51) Int. Cl.
*B62D 55/26* (2006.01)
*B62D 55/21* (2006.01)

(52) U.S. Cl.
CPC ............ *B62D 55/26* (2013.01); *B62D 55/21* (2013.01)

(58) Field of Classification Search
CPC ......... B62D 55/21; B62D 55/26; B62D 55/28
See application file for complete search history.

(56) References Cited

U.S. PATENT DOCUMENTS

| 3,336,088 | A | | 8/1967 | Bauer, Jr. | |
|---|---|---|---|---|---|
| 3,721,476 | A | | 3/1973 | Andersson | |
| 4,014,581 | A | * | 3/1977 | Groff | B62D 55/096 305/189 |
| 4,141,601 | A | * | 2/1979 | Stedman | B62D 55/28 305/191 |
| 4,185,877 | A | | 1/1980 | Tanoue et al. | |
| 8,876,227 | B2 | | 11/2014 | Meyer et al. | |
| 10,189,518 | B2 | | 1/2019 | Dumitru et al. | |
| 2009/0045674 | A1 | * | 2/2009 | Maeda | B62D 55/26 305/198 |
| 2014/0306516 | A1 | | 10/2014 | Knobloch et al. | |
| 2014/0332505 | A1 | | 11/2014 | Prest | |
| 2017/0036715 | A1 | * | 2/2017 | Johannsen | B62D 55/32 |

FOREIGN PATENT DOCUMENTS

| DE | 2815455 | A1 | 11/1978 |
|---|---|---|---|
| EP | 3235710 | | 10/2017 |
| JP | 0853080 | | 2/1996 |
| JP | H10181646 | A | 7/1998 |
| WO | 2006059624 | | 6/2006 |

* cited by examiner

*Primary Examiner* — S. Joseph Morano
*Assistant Examiner* — Emily G. Castonguay

(57) ABSTRACT

A ground-engaging track shoe includes a shoe plate having link-side fixturing surfaces and ground-side fixturing surfaces. The link-side fixturing surfaces and the ground-side fixturing surfaces are raised in profile relative to a link-facing surface and a ground-facing surface, respectively. The fixturing surfaces enable a fixture to clamp the track shoe for support during processing, enabling improvements in maintaining portions of the track shoe flat and reducing part to part variation.

20 Claims, 4 Drawing Sheets

GROUND-ENGAGING TRACK SHOE HAVING RAISED-RELIEF FIXTURING SURFACES

TECHNICAL FIELD

The present disclosure relates generally to a ground-engaging track shoe, and more particularly to a track shoe having fixturing surfaces for holding the track shoe with a clamping fixture during processing.

BACKGROUND

Ground-engaging track systems are used in a variety of machines in off-highway environments. Typical applications include construction, mining, forestry, landfills, and various others. In a typical configuration, a plurality of track links form an endless chain with attached track shoes that extends about rotatable track-engaging elements coupled to a machine frame. A ground-engaging track of this nature is typically provided at each of a left side and a right side of the machine. The tracks can be advanced in forward directions to move the machine forward, in reverse directions to move the machine backward, and rotated at differing speeds to turn the machine.

Off-highway environments where track-type machines are typically used can be quite harsh, including hard substrate materials, slippery and wet conditions, and machine activities where track systems are subjected to diverse and repetitive high loads. Over the course of a service life of a ground-engaging track, the large number of track shoes can experience various wear phenomena from contact with the substrate material, as well as torsional loads, bending loads, and others, that can hasten material fatigue and sometimes cause failure. Depending upon service conditions, track shoes typically need to be regularly replaced. Replacing dozens of track shoes for any given machine can be a labor intensive and relatively expensive endeavor. For this reason, track shoes are typically manufactured at high volumes and as economically as is reasonably feasible. Non-uniformity or aberrations in track shoe manufacturing can require undesired rework or scrapping. Variations among installed track shoes can complicate installation, shorten service life of the track or cause performance degradation.

In one track shoe manufacturing process, an elongate piece of rolled iron or steel is produced and cut into sections to provide consistent, interchangeable forms from which finished track shoes can be made. The individual cut sections are typically heat treated and quenched to increase hardness, fatigue life, and other properties of the individual track shoes. In the interest of efficiency and consistency in track shoe production, aberrations in shape, dimensions, or other properties are undesired as noted above. U.S. Patent Application Publication No. 2014/0332505 to Prest is directed to a method of manufacturing a track shoe. In the strategy proposed by Prest, a track shoe longbar has a sectional profile for a plurality of track shoes. One end of the longbar is engaged in a first chuck and a second end engaged in a second chuck. At least one of a hole or a notch is cut into the longbar using a laser cutter.

SUMMARY OF THE INVENTION

In one aspect, a ground-engaging track shoe includes a shoe plate having a first lateral edge, a second lateral edge, a front edge, and a back edge. The shoe plate further includes a middle plate section having a link-facing surface and a ground-facing surface opposite to the link-facing surface. Bolt holes arranged in a forward bolt hole set and a back bolt hole set extend through the middle plate section. The shoe plate further includes link-side fixturing surfaces each extending peripherally around the bolt holes in one of the forward bolt hole set and the back bolt hole set, and ground-side fixturing surfaces extending peripherally around the bolt holes in one of the forward bolt hole set and the back bolt hole set. The link-side fixturing surfaces are raised in profile relative to the link-facing surface in both a forward direction and a back direction, and the ground-side fixturing surfaces are raised in profile relative to the ground-facing surface in both the forward direction and the back direction.

In another aspect, a ground-engaging track shoe includes a shoe plate having a first lateral edge, a second lateral edge, a front edge, and a back edge. The shoe plate further includes a middle plate section having a link-facing side and a ground-facing side opposite to the link-facing side, an upturned lip transitioning from the middle plate section to the front edge, and a downturned lip transitioning from the middle plate section to the back edge. A grouser projects from the ground-facing side. The middle plate section is profiled to form forward fixturing surfaces raised in relief upon each of the link-facing side and the ground-facing side, and back fixturing surfaces raised in relief upon each of the link-facing side and the ground-facing side. The forward fixturing surfaces are located back of the upturned lip and aligned with one another fore and aft, and the back fixturing surfaces are located forward of the grouser and aligned with one another fore and aft.

In still another aspect, a track joint assembly includes a track chain assembly including two parallel chains of track links coupled together in an end-to-end arrangement. A track shoe includes a link-facing side in contact with track links in the track chain assembly, and a ground-contact side, forward fixturing surfaces raised in relief upon each of the link-facing side and the ground-facing side, and back fixturing surfaces raised in relief upon each of the link-facing side and the ground-facing side. The track shoe further includes bolt holes arranged in a forward bolt hole set extending through the forward fixturing surfaces and a back bolt hole set extending through the back fixturing surfaces, and bolts extending through the bolt holes and clamping the track shoe to track links in the two parallel chains of track links.

DETAILED DESCRIPTION

Figure 1:
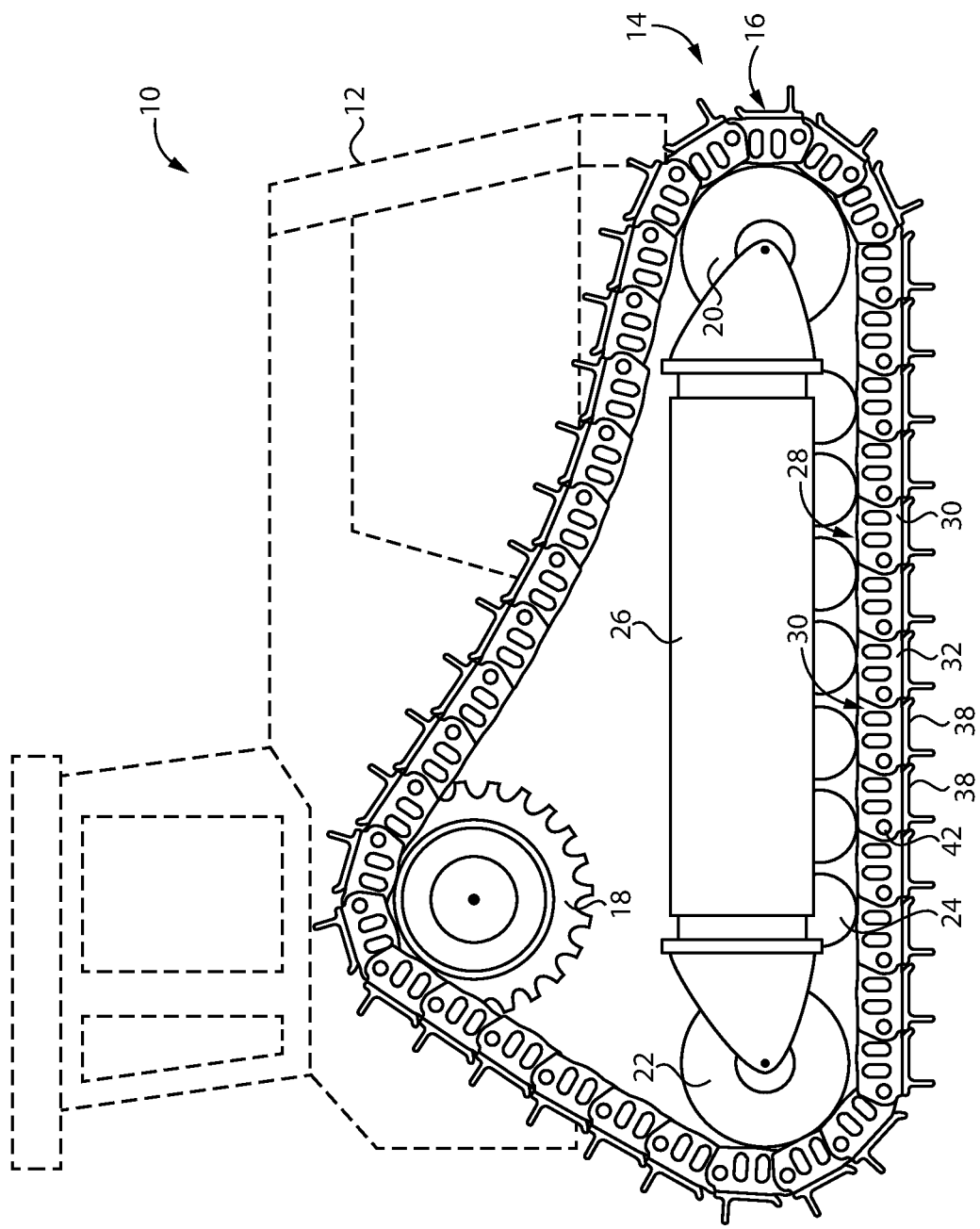
FIG. 1 is a side diagrammatic view of a machine, according to one embodiment.

Referring to FIG. 1, there is shown a machine 10, according to one embodiment. Machine 10 includes a machine frame 12, and a ground-engaging track system 14 coupled to machine frame 12. Track system 14 includes a track 16 extending about a rotatable drive sprocket 18, a front idler 20, a back idler 22, and a plurality of track rollers 24. Front idler 20, back idler 22, and track rollers 24 may be supported by a track roller frame 26. Another ground-engaging track and associated components substantially identical to those visible in FIG. 3 will typically be mounted to an opposite side of machine frame 12 hidden from view in the illustration. Machine 10 is shown in the context of a track-type tractor. In other instances, machine 10 could be a half-track machine, a track-type loader, an excavator, or still another. Track system 14 is shown with drive sprocket 18 positioned in a so-called "high drive" configuration. In other instances, track system 14 could have an oval track configuration with one drive sprocket and one idler. Track 16 includes a track chain assembly 28 including two parallel chains of track links coupled together in an end-to-end arrangement. In FIG. 1, a track chain 30 of track chain assembly 28 is shown having a plurality of track links 32. A plurality of track shoes 38 are attached to track links 36 and typically bolted in contact with track links in each of the two parallel chains of track links in track chain assembly 28. As will be further apparent from the following description, track shoes 38 may be uniquely configured for greater part-to-part uniformity, flatness of certain features, and ease of manufacturing.

Figure 2:
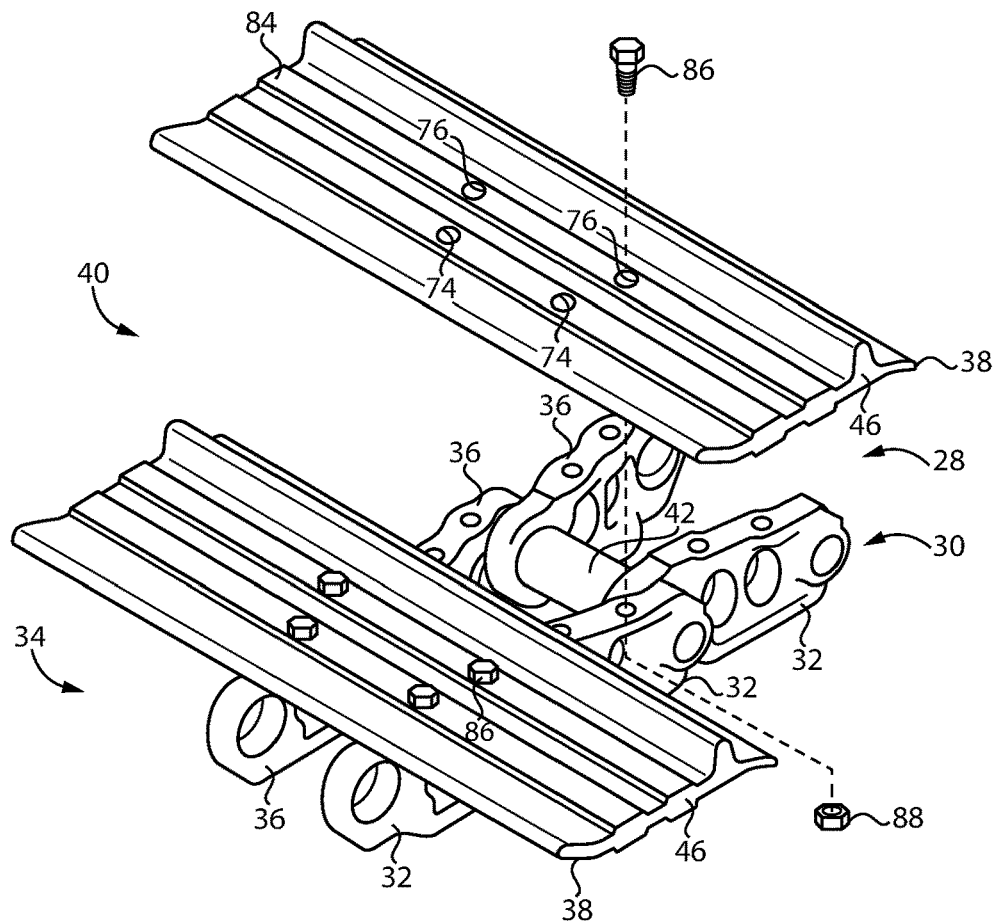
FIG. 2 is a diagrammatic view, partially disassembled, of a track joint assembly, according to one embodiment.

Referring also now to FIG. 2, there is shown a track joint assembly 40 including part of track chain 30 and part of a second, parallel track chain 34. Track chain 34 includes a plurality of track links 36. A plurality of track shoes 38, hereinafter referred to at times in the singular, are structured to be bolted to track links 32 and track links 36 in track chain 30 and track chain 34, respectively. Track chains 30 and 34 are coupled together by way of a plurality of track pins 42. Track pins 42 can be coupled with track chains 30 and 34 in any suitable manner, such as by way of interference fits, by way of positive pin retention, or any other suitable strategy. Track pins 42 could be equipped with bushings or could be bare. Track shoes 38 may be bolted to track links 32 and track links 36 by way of a plurality of bolts 86 extending through bolt holes in the respective track shoes 38, as further discussed herein. A nut 88 positionable, for instance, in a nut seat window in a track link, will engage with a bolt 86 passed through a track shoe 38 in one of track links 32 or 36.

Figure 3:
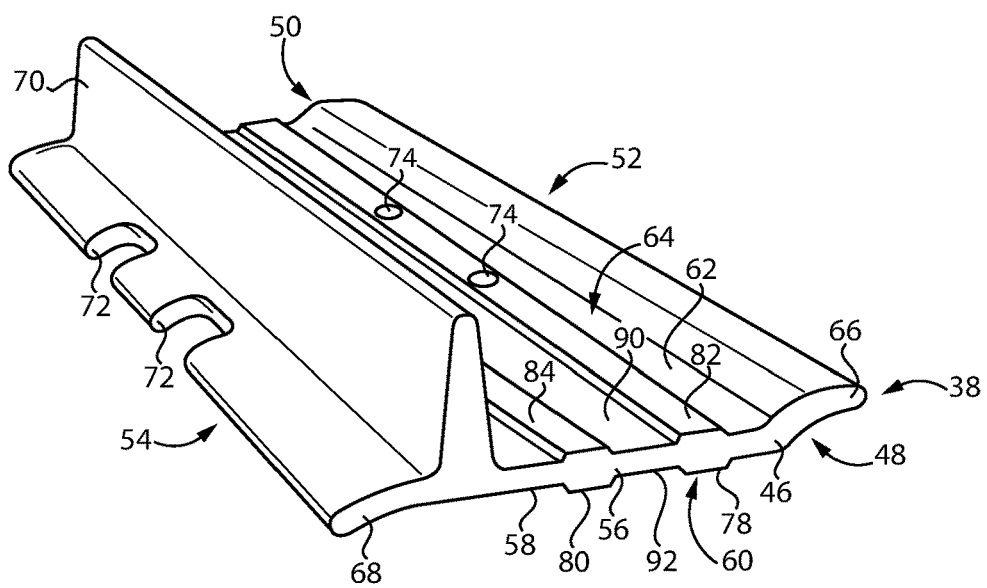
FIG. 3 is a perspective view of a track shoe, according to one embodiment.

Referring also now to FIG. 3, track shoe 38 includes a shoe plate 46 having a first lateral edge 48, a second lateral edge 50, a front edge 52, and a back edge 54. Shoe plate 46 further includes a middle plate section 56 having a link-facing surface 58 upon a link-facing side 60, and a ground-facing surface 62 upon a ground-facing side 64 opposite to link-facing surface 58. Bolt holes are arranged in a forward bolt hole set 74 and a back bolt hole set 76. Bolt holes of forward bolt hole set 74 and back bolt hole set 76 extend through middle plate section 56. Link-facing surface 58 and ground-facing surface 62 may be planar, except for raised relief portions further discussed herein. Shoe plate 46 further includes link-side fixturing surfaces 78 and 80 each extending peripherally around the bolt holes in one of forward bolt hole set 74 and back bolt hole set 76. Shoe plate 46 further includes ground-side fixturing surfaces 82 and 84 extending peripherally around the bolt holes in one of forward bolt hole set 74 and back bolt hole set 76. The respective link-side and ground-side fixturing surfaces may all be planar and each defining a common plane upon each respective link-facing side 60 and ground-facing side 64.

Link-side fixturing surfaces 78 and 80 are raised in profile relative to link-facing surface 58 in both a forward direction and a back direction. Ground-side fixturing surfaces 82 and 84 are raised in profile relative to ground-facing surface 62 in both the forward direction and the back direction. Put differently, link-side fixturing surfaces 78 and 80 and ground-side fixturing surfaces 82 and 84 have a higher profile relative to portions of the respective link-facing surface 58 and ground-facing surface 62 that are closer to front edge 52 and also portions closer to back edge 54. Middle plate section 56 can thus also be understood as profiled to form forward fixturing surfaces 82 and 78 raised in relief upon each of link-facing side 60 and ground-facing side 64, and profiled to form back fixturing surfaces 84 and 80 raised in relief upon each of link-facing side 60 and ground-facing side 62. Forward bolt hole set 74 may extend through forward fixturing surfaces 78 and 82, and back bolt hole set 76 may extend through back fixturing surfaces 80 and 84. As further discussed herein, the profile of shoe plate 46 upon link-facing side 60 and ground-facing side 64 provides for clamping and positioning of track shoe 38 for processing with less total area that needs to be controlled as compared with certain conventional strategies.

Track shoe 38 may further be structured such that shoe plate 46 includes an upturned lip 66 transitioning from middle plate section 56 to front edge 52, and a downturned lip 68 transitioning from middle plate section 56 to back edge 54. A grouser 70 is located upon ground-facing side 64 and projects in a vertical direction. Forward fixturing surfaces 78 and 82 may be aligned with one another in a fore and aft direction and located back of upturned lip 66. Back fixturing surfaces 80 and 84 may be aligned with one another in the fore and aft direction and located forward of grouser 70. A plurality of cutouts 72 are formed in downturned lip 68 and extend inwardly from back edge 54 as shown in FIG. 3. The terms front, back, lateral, vertical, and like directional indicators are used herein purely for convenience, and should not be understood to require any particular positioning, or arrangement or functionality of parts of track system 14. In the illustrated embodiment, link-side fixturing surfaces 78 and 80 may each be understood as aligned fore and aft with one of ground-side fixturing surfaces 82 and 84. Link-side fixturing surfaces 78 and 80 and ground-side fixturing surfaces 82 and 84 may each include two fixturing surfaces extending continuously from first lateral edge 48 to second lateral edge 50. As noted above, link-side fixturing surfaces 78 and 80 extend peripherally around bolt holes in one of forward bolt hole set 74 and back bolt hole set 76. In the illustrated embodiment each of the bolt holes in forward bolt hole set 74 are surrounded by link-side fixturing surface 82 and ground-side fixturing surface 78, and each of the bolt holes in back bolt hole set 76 are surrounded by link-side fixturing surface 80 and ground-side fixturing surface 84. Also in the illustrated embodiment, bolt holes 74 and 76 are arranged in a trapezoidal pattern. In other embodiments, bolt holes 74 and 76 could form a square pattern, a rectangular pattern, or still another.

It will be noted that link-facing surface 58 and ground-facing surface 62 can each be understood as separate sections of a surface separated by the respective fixturing surfaces. Link-facing surface 58 can be understood to originate/terminate at downturned lip 68 and originate/terminate at upturned lip 66, thus extending fore and aft between downturned lip 68 and upturned lip 66. Ground-facing surface 62 can be understood to originate/terminate at grouser 70 and originate/terminate at upturned lip 66, thus extending fore and aft between grouser 70 and upturned lip 66. In an embodiment, combined surface areas of link-side fixturing surfaces 78 and 80, and combined surface areas of ground-side fixturing surfaces 82 and 84, are less than surface areas, respectively, of link-facing surface 58 and ground-facing surface 62. A first reduced-relief channel 90 may be formed between, in the fore and aft direction, link-side fixturing surfaces 78 and 80. A second reduced-relief channel 92 may be formed between, in the fore and aft direction, ground-side fixturing surfaces 82 and 84.

Figure 4:
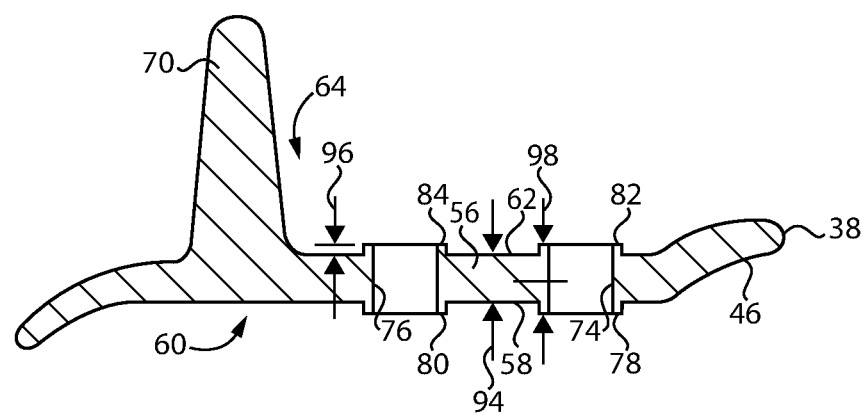
FIG. 4 is a sectioned side diagrammatic view of a track shoe, according to one embodiment.

Referring also now to FIG. 4, there are shown additional features of track shoe 30 including dimensional and proportional attributes, in further detail. A shoe plate thickness 94 is defined at a location outside of link-side fixturing surfaces 78 and 80 and outside of ground-side fixturing surfaces 82 and 84, such as between forward bolt hole set 74 and back bolt hole set 76. A raised relief height 96 of each of link-side fixturing surfaces 78 and 80 and ground-side fixturing surfaces 82 and 84 may be from 2% to 13% of shoe plate thickness 94. In a refinement, raised relief height 96 is from 2.3% to 12.5% of shoe plate thickness 94. Shoe plate thickness 94 may also be defined at a location forward of forward fixturing surfaces 78 and 82, at a location back of back fixturing surfaces 80 and 84, and at a location, approximately as where illustrated in FIG. 4, between forward fixturing surfaces 78 and 82 and back fixturing surfaces 80 and 84. A full thickness 98 of shoe plate 46 can be defined as a vertical thickness at a location of aligned forward fixturing surfaces 78 and 82 or aligned back fixturing surfaces 80 and 84. Full thickness 98 may be from 104% to 138% of shoe plate thickness 94. In some instances, shoe plate thickness 94 may be in a range from approximately 8 millimeters to approximately 22 millimeters. Raised relief height 96 may be in a range from approximately 0.5 millimeters to approximately 1.5 millimeters. Approximately means within measurement error, or within another tolerance that would be routinely assigned by one of skill in the undercarriage arts. The proportions and dimensions set forth herein are exemplary only, but provide practical implementation strategies for track shoe construction that accommodates or preserves installation patterns, weight requirements, and enables improved clamping and control during processing, as further discussed herein.

Figure 5:
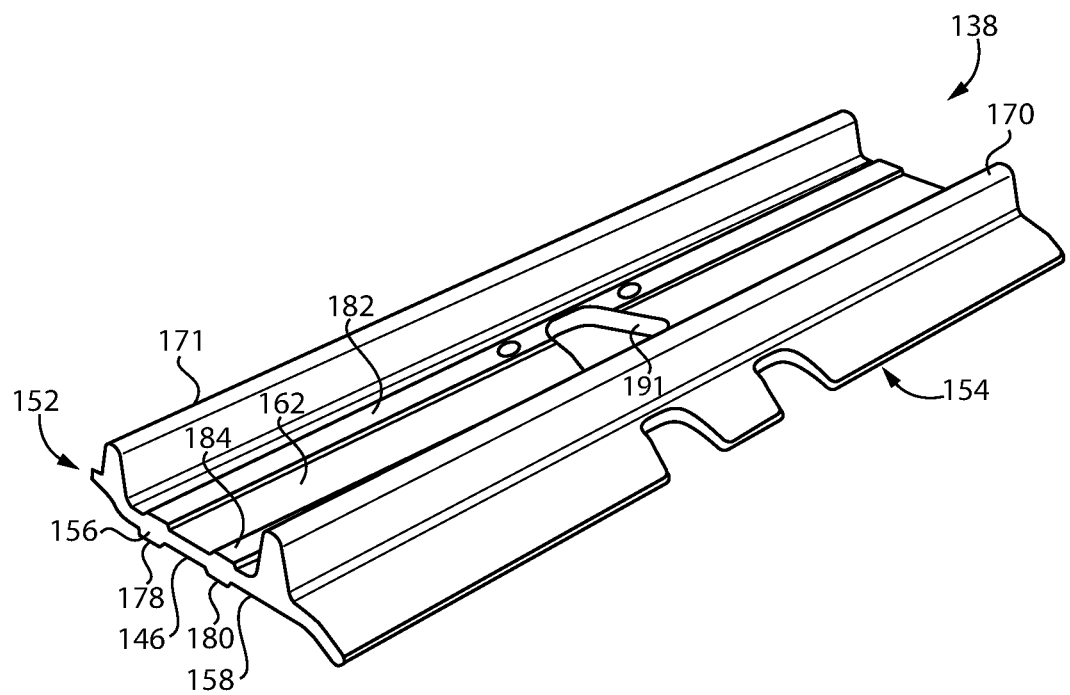
FIG. 5 is a perspective view of a track shoe, according to another embodiment.

Referring now to FIG. 5, there is shown a ground-engaging track shoe 138 according to another embodiment. Track shoe 138 has certain similarities with track shoe 38, but also certain differences. Track shoe 138 includes a shoe plate 146 having a front edge 152 and a back edge 154. A back grouser is shown at 170, and a front grouser is shown at 171. A middle plate section 156 of shoe plate 146 includes a link-facing surface 158 upon a link-facing side, and a ground-facing surface 162 upon a ground-facing side. Link-side fixturing surfaces, raised in relief analogously and potentially substantially identically to that of foregoing embodiments, are shown at 178 and 180. Ground-side fixturing surfaces 182 and 184, are raised in relief relative to ground-facing surface 162, again analogously or substantially identically to foregoing embodiments. Dimensions and proportions, including thicknesses, relative thicknesses, relief heights, relative relief heights, and a full thickness, of track shoe 138 may be substantially identical to that discussed in connection with foregoing embodiments. Track shoe 138 could be a master shoe structured to couple with master track links in a ground-engaging track. A service window 191 extends through middle plate section 156 between link-facing surface 158 and ground-facing surface 162. Fixturing surfaces 178, 180, 182, 184 may each extend a full lateral width of track shoe 138 but may intersect service window 191. It should also be appreciated that a master shoe as contemplated herein could be a single grouser track shoe. Moreover, a multiple-grouser track shoe as contemplated herein might not be a master shoe and could be structured without a service window. Description, discussion, or illustration of any one embodiment herein should be understood to refer by way of analogy to any other embodiment except where otherwise indicated or apparent from the context.

INDUSTRIAL APPLICABILITY

Figure 6:
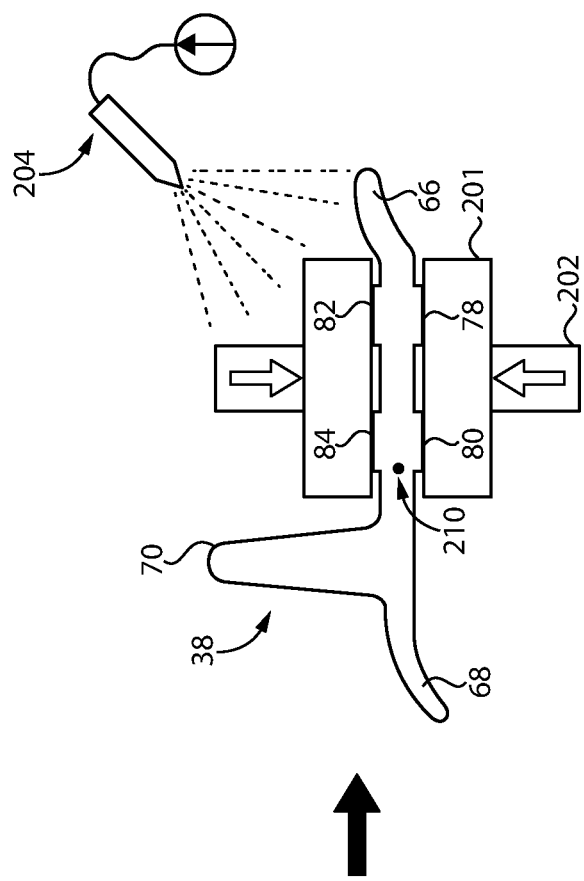
FIG. 6 is a diagrammatic view of processing stages in making a track shoe, according to one embodiment.
Figure 6:
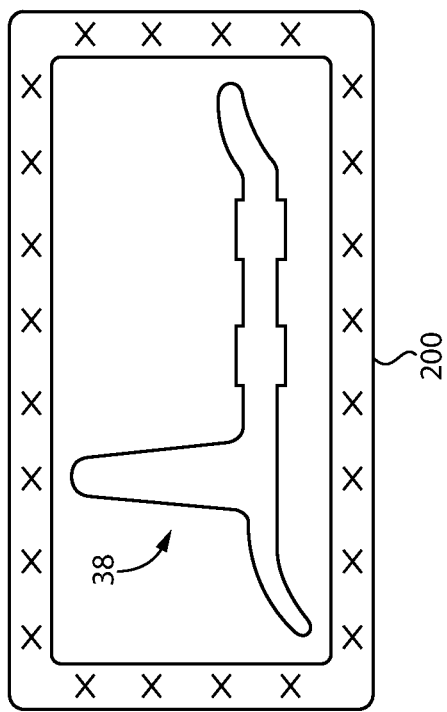

Referring now to the drawings generally, but also to FIG. 6, there is shown track shoe 38 at one processing stage within a heat treat furnace 200, and at another processing stage positioned for water spraying by way of a sprayer 204. As alluded to above, it is desirable to limit part-to-part variations amongst track shoes. It has been observed that during a water spray quenching process following a furnace treatment that track shoes can sometimes experience deformation in a manner that varies shoe to shoe. To enable proper installation and in-service performance, it tends to be highly desirable to maintain bolting areas as close to perfectly flat as possible. According to earlier strategies employing track shoes ideally uniformly flat upon both sides of a middle plate section, it was generally necessary to clamp a fixture to an entirety of the exposed surface of the ground-facing side and link-facing side between the fore and aft lip portions.

In the right-hand image in FIG. 6, a fixture 201 is shown clamped by way of a fixture actuator 202 into contact with fixturing surfaces 78, 80, 82, 84. It can be observed that a surface area of track shoe 38 that is actually in contact with fixture 201 is relatively small compared to a clamping or contact area that would be required without the raised relief provided by the respective fixturing surfaces. The relatively smaller clamping or fixturing surface area generally makes it easier to securely and reliably clamp track shoe 38 as relatively less area needs to be precisely controlled. Also shown in FIG. 6 is an example concentration of mass 210. According to prior strategies, without the profiles provided upon the ground-facing and link-facing sides of track shoe 38, a track shoe could be expected to curl slightly, at least in some instances, around a concentration of mass when quenched with a water spray, exhibiting a so-called "pringling" or "potato chipping" phenomenon. By reducing or eliminating any tendency of track shoe 38 to curl around concentration of mass 210 a higher quality product and less re-work to correct part-to-part variations is expected.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A ground-engaging track shoe comprising:
   a shoe plate including a first lateral edge, a second lateral edge, a front edge, a back edge, and a middle plate section having a link-facing surface and a ground-facing surface opposite to the link-facing surface;

bolt holes arranged in a forward bolt hole set and a back bolt hole set extend through the middle plate section;

the shoe plate further including link-side fixturing surfaces each extending peripherally around the bolt holes in one of the forward bolt hole set and the back bolt hole set, and ground-side fixturing surfaces extending peripherally around the bolt holes in one of the forward bolt hole set and the back bolt hole set; and the link-side fixturing surfaces are raised in profile relative to the link-facing surface in both a forward direction and a back direction, and the ground-side fixturing surfaces are raised in profile relative to the ground-facing surface in both the forward direction and the back direction.

2. The track shoe of claim 1 wherein the shoe plate includes an upturned lip transitioning from the middle plate section to the front edge, a downturned lip transitioning from the middle plate section to the back edge, and a grouser.

3. The track shoe of claim 2 wherein:

the link-facing surface extends between the downturned lip and the upturned lip, and the ground-facing surface extends between the grouser and the upturned lip; and combined surface areas of the link-side fixturing surfaces and combined surface areas of the ground-side fixturing surfaces are less than surface areas, respectively, of the link-facing surface and the ground-facing surface.

4. The track shoe of claim 1 wherein the link-side fixturing surfaces and the ground-side fixturing surfaces each include two fixturing surfaces extending continuously from the first lateral edge to the second lateral edge.

5. The track shoe of claim 4 wherein the link-side fixturing surfaces are each aligned fore and aft with one of the ground-side fixturing surfaces.

6. The track shoe of claim 5 wherein a first reduced-relief channel is formed fore and aft between the link-side fixturing surfaces, and a second reduced-relief channel is formed fore and aft between the ground-side fixturing surfaces.

7. The track shoe of claim 1 wherein:

a shoe plate thickness is defined by the middle plate section outside of the link-side fixturing surfaces and the ground-side fixturing surfaces; and a raised relief height of each of the link-side fixturing surfaces and the ground-side fixturing surfaces is from 2% to 13% of the shoe plate thickness.

8. The track shoe of claim 7 wherein the raised relief height is from 2.3% to 12.5% of the shoe plate thickness.

9. A ground-engaging track shoe comprising:

a shoe plate including a first lateral edge, a second lateral edge, a front edge, a back edge, a middle plate section having a link-facing side and a ground-facing side opposite to the link-facing side, an upturned lip transitioning from the middle plate section to the front edge, and a downturned lip transitioning from the middle plate section to the back edge;

a grouser projecting from the ground-facing side;

the middle plate section is profiled to form forward fixturing surfaces raised in relief upon each of the link-facing side and the ground-facing side, and back fixturing surfaces raised in relief upon each of the link-facing side and the ground-facing side; and the forward fixturing surfaces are located back of the upturned lip and aligned with one another fore and aft, and the back fixturing surfaces are located forward of the grouser and aligned with one another fore and aft.

10. The track shoe of claim 9 wherein each of the forward fixturing surfaces and the back fixturing surfaces extends continuously from the first lateral edge to the second lateral edge.

11. The track shoe of claim 10 including a total of two forward fixturing surfaces and a total of two back fixturing surfaces.

12. The track shoe of claim 11 further comprising bolt holes arranged in a forward bolt hole set extending through the forward fixturing surfaces and a back bolt hole set extending through the back fixturing surfaces.

13. The track shoe of claim 10 wherein a first reduced-relief channel is formed upon the link-facing side between the respective forward fixturing surface and back fixturing surface, and a second reduced-relief channel is formed upon the ground-facing side between the respective forward fixturing surface and back fixturing surface.

14. The track shoe of claim 9 wherein:

a link-facing surface upon the link-facing side extends between the upturned lip and the downturned lip, and a combined surface area of the forward fixturing surface and back fixturing surface upon the link-facing side is less than a surface area of the link-facing surface; and a ground-facing surface upon the ground-facing side extends between the grouser and the upturned lip, and a combined surface area of the forward fixturing surface and the back fixturing surface upon the ground-facing side is less than a surface area of the ground-facing surface.

15. The track shoe of claim 9 wherein the shoe plate defines a shoe plate thickness of the middle plate section outside of the forward fixturing surfaces and the back fixturing surfaces, and a raised relief height of each of the link-side fixturing surfaces and the ground-side fixturing surfaces is from 2% to 13% of the shoe plate thickness.

16. The track shoe of claim 15 wherein the raised relief height is from 2.3% to 12.5% of the shoe plate thickness.

17. The track shoe of claim 15 wherein:

the shoe plate defines the shoe plate thickness at a location forward of the forward fixturing surfaces, at a location back of the back fixturing surfaces, and at a location between the forward fixturing surfaces and the back fixturing surfaces; and a full thickness is defined between the forward fixturing surfaces and between the back fixturing surfaces and is from 104% to 138% of the shoe plate thickness.

18. A track joint assembly comprising:

a track chain assembly including two parallel chains of track links coupled together in an end-to-end arrangement;

a track shoe having a link-facing side in contact with track links in the track chain assembly, and a ground-contact side, forward fixturing surfaces raised in relief upon each of the link-facing side and the ground-facing side, and back fixturing surfaces raised in relief upon each of the link-facing side and the ground-facing side;

the track shoe further including bolt holes arranged in a forward bolt hole set extending through the forward fixturing surfaces and a back bolt hole set extending through the back fixturing surfaces; and bolts extending through the bolt holes and clamping the track shoe to track links in the two parallel chains of track links.

19. The track joint assembly of claim 18 wherein the forward fixturing surfaces and the back fixturing surfaces each include a total of two fixturing surfaces each extending continuously from a first lateral edge to a second lateral edge of the track shoe.

20. The track joint assembly of claim 19 wherein the shoe plate defines a shoe plate thickness outside of the forward fixturing surfaces and the back fixturing surfaces, and a raised relief height of each of the link-side fixturing surfaces and the ground-side fixturing surfaces is from 2% to 13% of the shoe plate thickness.

* * * * *